US008709200B2

(12) United States Patent
Müssig et al.

(10) Patent No.: US 8,709,200 B2
(45) Date of Patent: Apr. 29, 2014

(54) METHOD FOR CORROSION PROTECTION TREATMENT

(75) Inventors: Bernhard Müssig, Seevetal (DE); Matthias Seibert, Hamburg (DE); Michael Stromann, Hamburg (DE)

(73) Assignee: tesa SE, Hamburg (DE)

( * ) Notice: Subject to any disclaimer, the term of this patent is extended or adjusted under 35 U.S.C. 154(b) by 0 days.

(21) Appl. No.: 13/144,137

(22) PCT Filed: Jan. 6, 2010

(86) PCT No.: PCT/EP2010/050069
§ 371 (c)(1),
(2), (4) Date: Sep. 22, 2011

(87) PCT Pub. No.: WO2010/084031
PCT Pub. Date: Jul. 29, 2010

(65) Prior Publication Data
US 2012/0000591 A1    Jan. 5, 2012

(30) Foreign Application Priority Data
Jan. 20, 2009  (DE) .......................... 10 2009 005 517

(51) Int. Cl.
*B32B 37/04*  (2006.01)
*B32B 37/16*  (2006.01)

(52) U.S. Cl.
USPC .................................... 156/309.6; 427/388.1

(58) Field of Classification Search
USPC .................... 156/307.7, 309.6, 247, 275.5; 427/388.1
See application file for complete search history.

(56) References Cited

U.S. PATENT DOCUMENTS

| | | | |
|---|---|---|---|
| 5,300,356 A * | 4/1994 | Dempster et al. | 428/220 |
| 5,656,698 A | 8/1997 | Hentges et al. | |
| 5,985,435 A | 11/1999 | Czaplicki et al. | |
| 6,350,791 B1 | 2/2002 | Feichtmeier et al. | |
| 2002/0011308 A1 | 1/2002 | Johnson et al. | |
| 2007/0020471 A1 * | 1/2007 | Pip et al. | 428/500 |
| 2008/0302448 A1 | 12/2008 | Frey et al. | |
| 2009/0008026 A1 | 1/2009 | Kopf et al. | |
| 2010/0038025 A1 | 2/2010 | Keiten-Telgen-Buescher et al. | |
| 2011/0056616 A1 | 3/2011 | Kopf et al. | |
| 2011/0067799 A1 | 3/2011 | Muessig et al. | |

FOREIGN PATENT DOCUMENTS

| | | |
|---|---|---|
| CN | 1197904 A | 11/1998 |
| DE | 10 2006006910 B3 | 5/2007 |
| DE | 10 2005 059 314 A1 | 6/2007 |
| DE | 102007007617 | 8/2008 |
| EP | 2011845 A2 | 1/2009 |
| WO | 2006102150 A2 | 9/2006 |
| WO | 2009/133175 A1 | 11/2009 |

OTHER PUBLICATIONS

English-language translation of International Search Report dated Apr. 29, 2010.
English-language Translation of Chinese Office Action for corresponding CN Application No. 201080004912.6 dated Apr. 9, 2013.

* cited by examiner

*Primary Examiner* — Scott W Dodds
(74) *Attorney, Agent, or Firm* — Norris McLaughlin & Marcus, P.A.

(57) ABSTRACT

A method provides an adhesive strip to protect metal surfaces from corrosion. The adhesive strip has a layer of olefin polymer with a density between 0.86 g/cm$^3$ and 0.91 g/cm$^3$ and a crystallite melting point of at least 105° C. The adhesive strip is applied onto a metal surface, and the strip is heated such that the layer is molten, thereby forming a corrosion protection layer for the metal surface.

19 Claims, No Drawings

METHOD FOR CORROSION PROTECTION TREATMENT

This is a 371 of PCT/EP2010/050069 filed 6 Jan. 2010 (international filing date), and claims the priority of German Application No. 10 2009 005 517.7 filed 20 Jan. 2009.

The present invention relates to a method for the corrosion control treatment of metal surfaces, and also to the use of a self-adhesive for the corrosion control treatment of metal surfaces.

Metal components are used in diverse sectors. They are exposed there to any of a very wide variety of weathering conditions, and so often there is a need for corrosion control treatment. Known for this purpose, especially for application of a corrosion control layer over the full area of metal components, are a variety of methods. DE 10 2006 006 910 B3, for example, discloses a method in which a corrosion control layer in the form of a zinc lamellae coating is applied to the metal surfaces that are to be protected. The zinc lamellae coating is applied by means of a dipping or spraying method. In another method known from the prior art, a corrosion control treatment is effected by immersing the metal surfaces into a cathodically depositable electrodeposition coating material (DE 10 2005 059 314 A1). A feature common to the two abovementioned methods is that the corrosion control layer is applied to a relatively large area, and more particularly to the full area, of the metal surface to be treated.

In the automobile industry in particular, however, there is a need for small areas as well to be protected from corrosion by a corrosion control layer, these being the surface of edges and transitions of metal components. For this purpose, in general, a precision seam seal is applied manually or by means of a robot. Material used for the precision seam is typically pumpable PVC plastisol. It is applied locally to the metal surface by spraying and then smoothed flat by means of a brush. With this method, which is suitable fundamentally for edges and transitions, it is difficult to produce the precision seam in the optical quality that is needed in vehicle construction. Instead, the surface often remains rough, and an uneven application is visible to the naked eye. Furthermore, there is no assurance that the application is complete, in order to ensure complete protection against corrosion.

The problem on which the present invention is based, therefore, is that of specifying a method for the corrosion control treatment of metal surfaces that can be carried out without great cost and inconvenience and in particular that can also be used for protecting edges and transitions of metal components.

The problem indicated above is solved by a method for the corrosion protection treatment of metal surfaces as set forth herein. A co-independent solution is represented by the use of an adhesive tape as set forth herein. Advantageous embodiments and developments are also described herein.

In accordance with the invention it has been recognized that an adhesive tape having a meltable special poly-olefinic layer is able in such methods to form an effective corrosion control layer on metal surfaces, and, accordingly, is suitable for corrosion control treatment. In tests, moreover, it emerged that, by means of suitable self-adhesive formulas, smooth surfaces can be formed. Smooth surfaces of this kind present a uniform surface structure to the naked eye of a viewer, and are planar. The use of an adhesive tape of this kind for forming a corrosion control layer on metal surfaces is particularly advantageous on account of the ease of operation. In view of the self-adhesive effect, the meltable layer can be applied particularly easily to the surfaces, where it can be fixed preliminarily prior to further operating steps. A design of this kind is also suitable in particular for use on small areas.

In the method of the invention, the adhesive tape is applied to the metal surface in question and is subsequently heated. The layer is a material of a kind which melts by heating, which on heating spreads over the metal surface, is able to flow into joints, and at the same time forms a continuous and generally smooth corrosion control layer. In one embodiment, the adhesive tape may even have been heated prior to application to the metal surface, such that the layer has melted.

The invention accordingly provides a method for the corrosion control treatment of metal surfaces, especially on edges and transitions of the metal components, by application of an adhesive tape having a layer of an olefin polymer having a density of between 0.86 and 0.91 g/cm$^3$ and a crystallite melting point of at least 105° C. to the metal surface and by heating such that the layer is melted and thus a corrosion control layer is formed. The term "adhesive tape" encompasses not only the role format but also sections, diecuts, labels, and other forms of presentation. The invention also provides for the use of an adhesive tape of this kind for the corrosion control treatment of metal surfaces, more particularly in a method as set forth herein. By metal surface is meant not only elemental metal; instead, the surface may have been treated by roughening, priming, anticorrosive treatment such as cathodic deposition coating, or other customary finishing methods. One preferred form of the method is the sealing of joints on automobile bodies.

The skilled person considered olefin polymers to be unsuitable for adhesive. Nevertheless, surprisingly, adhesives for adhesive tapes having outstanding adhesive properties can be produced from olefin polymers having a density of between 0.86 and 0.91 g/cm$^3$, preferably between 0.86 and 0.88 g/cm$^3$, more preferably between 0.86 and 0.87 g/cm$^3$, and a crystallite melting point of at least 105° C., preferably at least 115° C., more preferably at least 135° C. An adhesive of this kind thus combines the properties of an adhesive tape with those of a meltable layer which, after heating, forms the corrosion control layer.

In another embodiment, the meltable layer for fixing on the metal surface is equipped with a pressure-sensitive adhesive, preferably based on polyacrylates. This is especially advantageous if the meltable layer does not adhere sufficiently at application temperature. For the skilled person it was surprising that the use of an adhesive tape having a layer of meltable soft polyolefin forms a viscoelastic corrosion control layer which, in terms of the simplicity of the method and of the technical properties, is superior to the application of a plastisol paste.

For transport, storage or diecutting, the adhesive tape is preferably provided on at least one side with a liner—that is, for example, with a silicone-coated film or with silicone paper.

The olefin polymer of the invention preferably has a melt index of less than 8 g/10 min, more preferably less than 1.5 g/10 min. The flexural modulus of the olefin polymer is preferably less than 50 MPa, more preferably less than 26 MPa, and more particularly less than 17 MPa.

The olefin polymer is, for example, a polypropylene resin, which may have been synthesized in various ways, as—for example—a block copolymer, a graft polymer or a so-called reactor blend as in the case of hetero-phase polypropylenes (also called impact polypropylene or—not entirely correctly, but typically—poly-propylene block copolymer). The polypropylene resin is not a conventional, nonheterophase polypropylene random copolymer, comprising the propylene monomer and the further olefin monomer (ethylene or butene, for example) in random distribution, since these polymers are able to achieve only low shear strengths, bond strengths, and heat resistances. The polypropylene resin is preferably a block copolymer, a graft polymer or a heterophase polypropylene. In the crystalline component, however, a heterophase polypropylene must contain small amounts of a comonomer, provided the crystallite melting point is still within the range according to the invention. Polypropylene resin may also be a homopolymer, if the required technical properties are achieved by control of the tacticity.

The olefin polymer may also comprises ethylene or butene, rather than propylene, as the main component. The olefin polymer preferably comprises ethylene or propylene and at least one further comonomer selected from the $C_2$ to $C_{10}$ olefins, more preferably $C_2$ to $C_{10}$ α-olefins. Particularly suitable are copolymers of ethylene and propylene, ethylene and but-1-ene, ethylene and oct-1-ene, propylene and but-1-ene, or a terpolymer of ethylene, propylene, and but-1-ene.

The density of the polyolefin is determined to ISO 1183 and expressed in g/cm$^3$. The melt index is tested to ISO 1133 and 2.16 kg and expressed in g/10 min. The testing temperature, as the skilled person is aware, is 230° C. for propylene-based polyolefins and 190° C. for ethylene-based polymers. The flexural modulus is to be determined to ASTM D 790 (secant modulus at 2% strain). The crystallite melting point ($T_{cr}$) and the heat of fusion are determined by DSC (Mettler DSC 822) with a heating rate of 10° C./min to ISO 3146; where two or more melting peaks occur, the peak with the highest temperature is selected, since, in the case of resin modification or plasticizer modification, only melting peaks above 100° C. will be retained in formulations, and effective, whereas melting peaks considerably below 100° C. are not retained and have no effect on the product properties. The selection of the crystallite melting point is important because, on heating in accordance with the method, the layer must melt, but the finished component with the corrosion layer is also to exhibit sufficient heat resistance at service temperature. The heat of fusion of the olefin polymer determines first the elastic and plastic properties of the layer and second the melting behavior under hot conditions, and is preferably between 3 and 15 J/g, more preferably between 5 and 18 J/g.

It has emerged that the olefin polymer is able to accommodate considerable quantities (more than 100 phr) of tackifier resin. By means of the tackifier resin it is possible to influence not only adhesive properties of the layer to the metal surface, but also to subsequent plastisol layers or paint layers. Furthermore, resins can be used to adjust the melting behavior of the layer and also the dynamomechanical properties of the corrosion control layer.

The amount of tackifier resin is preferably 50 to 300 phr, more preferably 100 to 200 phr (phr denotes parts by weight per 100 parts by weight of resin or rubber—in this case, olefin polymer). The polydispersity of the tackifier resin is the ratio of weight average to number average in the molar mass distribution, and can be determined by gel permeation chromatography. In addition to the quantity of resin, polydispersity is important for the properties. As tackifier resin use is therefore made of those having a polydispersity of less than 2.1, preferably less than 1.8, more preferably less than 1.6. A further influencing variable is the melting point of the tackifier resin (determined to DIN ISO 4625).

As tackifier resin it has emerged that resins based on rosin (balsam resin, for example) or on rosin derivatives (for example, disproportionated, dimerized or esterified rosin), preferably in partially or completely hydrogenated form, are highly suitable. Terpene-phenolic resins, like the hydrogenated resins, are notable for particularly high aging resistance. Preference is likewise given to hydrocarbon resins, which are highly compatible presumably on account of their polarity. These are for example, aromatic resins such as coumarone-indene resins or resins based on styrene or α-methylstyrene, or cycloaliphatic hydrocarbon resins from the polymerization of $C_5$ monomers such as piperylene, or $C_5$ or $C_9$ fractions from crackers, or terpenes such as β-pinene or δ-limonene or combinations thereof, preferably in partially or fully hydrogenated form, and hydrocarbon resins obtained by hydrogenating aromatics-containing hydrocarbon resins or cyclopentadiene polymers.

For the setting of the desired properties, the layer of the invention preferably comprises a liquid plasticizer such as, for example, aliphatic (paraffinic or branched) and cycloaliphatic (naphthenic) mineral oils, esters of adipic, phthalic, trimellitic, and citric acids, waxes such as wool wax, liquid rubbers (for example, low molecular mass nitrile rubbers, butadiene rubbers or polyisoprene rubbers), liquid polymers of isobutene homopolymer and/or isobutene-butene copolymer, liquid resins and plasticizing resins having a melting point below 40° C. and based on the raw materials for tackifier resins, more particularly the above-recited classes of tackifier resin. Particular preference is given to liquid polymers of isobutene and/or butene, mineral oils and esters such as are used for PVC plastisol coatings.

In order to optimize the properties of the layer, it may comprise further additives such as fillers, pigments, antioxidants or crosslinking agents. Suitable fillers and pigments are, for example, zinc oxide, titanium dioxide, calcium carbonate, zinc carbonate, silicates, and silica.

The layer of the invention can be produced from solution and also from the melt. Preferred preparation and processing methods take place from the melt. For the latter case, suitable preparatory operations encompass not only batch methods but also continuous methods. Particularly preferred is the continuous manufacture by means of an extruder with subsequent coating directly on a liner with or without layer of adhesive.

In order to optimize the adhesion between the layer of the invention and any subsequent plastisol layer or paint layer, it can be modified. Examples thereof are physical treatments with corona discharge or plasma, coating with adhesion-promoting substances such as hydrogenated nitrile rubber, vinylidene chloride polymer, or adhesion promoters of the kind known to the skilled person for the priming of plastics components made of polyolefins (for example, automobile fenders) for subsequent paint coatings. Moreover, the surface may also, for this purpose, have been modified with a film such as, for example, PVC, polyester (PEN, PET) or polystyrene.

In some cases, moreover, a barrier layer is useful in order to prevent migration of plasticizer from the plastisol layer into the corrosion control layer, or migration of plasticizer from the corrosion control layer into a paint layer. This barrier layer may be, for example, a coating with vinylidene chloride polymer or application of a polyester film.

The layer of the invention ought to have a layer thickness of at least 50 μm, preferably of at least 100 μm, more preferably of at least 200 μm. Moreover, the layer thickness ought to be not more than 750 μm, preferably not more than 600 μm, more preferably not more than 400 μm. The choice of the layer thickness ensures that the metal surface is sufficiently covered when the layer of the invention is melted, and also that the layer does not run nonuniformly (as a result of excessive flow, for example) and that the thickness of the corrosion control layer does not become too great.

For application, it has emerged as particularly suitable first to wind the adhesive tape onto a roll. Later on, it can be taken from this roll or applied as a diecut to the metal surface.

In the method, the layer is melted preferably at not less than 90° C., more preferably at not less than 110° C., and more particularly at not less than 130° C.

The general expression "adhesive tape" encompasses, for the purposes of this invention, all sheetlike structures such as two-dimensionally extended films or film sections, tapes with extended length and limited width, tape sections and the like, and lastly diecuts or labels as well.

In the text below, the invention is illustrated by a number of examples, without wishing thereby to restrict the invention.

Raw materials of the examples:

NOTIO PN-0040: copolymer of propylene and but-1-ene (optionally with small amounts of ethylene as well), melt index 4 g/10 min, density 0.868 g/cm$^3$, flexural modulus 42 MPa, crystallite melting point 159° C., heat of fusion 5.2 J/g Softell CA02: copolymer of propylene and ethylene, melt index 0.6 g/10 min, density 0.870 g/cm$^3$, flexural modulus 20 MPa, crystallite melting point 142° C., heat of fusion 9.9 J/g PB 8640M: copolymer of 1-butene with a little ethylene, melt index 1 g/10 min, density 0.906 g/cm$^3$, flexural modulus 300 MPa, crystallite melting point 113° C.

Vistamaxx 1100 copolymer of propylene with ethylene, melt index 2 g/10 min, density 0.862 g/cm$^3$, flexural modulus 13.6 MPa, crystallite melting point 161° C.

LD 251: LDPE, melt index 8 g/10 min, density 0.9155 g/cm$^3$, flexural modulus 180 MPa, crystallite melting point 104° C.

Engage 7467: copolymer of ethylene and but-1-ene, melt index 1.2 g/10 min, density 0.862 g/cm$^3$, flexural modulus 4 MPa, crystallite melting point 34° C.

Ondina 933: white oil (paraffinic-naphthenic mineral oil)

Palatinol N diisononyl phthalate

Regalite R1100: hydrogenated aromatic hydrocarbon resin, melting point 100° C., polydispersity 1.9

Foral 85: fully hydrogenated glycerol ester of rosin, having a melting point of 85° C. and a polydispersity of 1.2

Irganox 1726: phenolic antioxidant with sulfur-based function of a secondary antioxidant

EXAMPLE 1

The adhesive tape consists of silicone paper with a pressure-sensitively adhesive melt coating, 300 μm thick, of the following components:

| 100 phr | NOTIO PN-0040 |
| 200 phr | Regalite R1100 |
| 30 phr | Palatinol N |
| 1 phr | Irganox 1726 |

The adhesive tape is adhered in a width of 20 mm over the joint of two cathodically electrocoated steel panels 0.5 mm thick, with an overlap of 10 mm, and the silicone paper is removed.

This assembly is subsequently heated at 170° C. for 40 minutes. Heating leads to the melting of the polyolefin layer onto the metal surface, and so a uniformly flowed-out corrosion control layer is formed. After the metal panels have cooled, the corrosion control layer shows a smooth surface. The panel edge between the two metal panels still remains visible, but the joint is completely sealed.

The metal panels are subsequently subjected to different ambient conditions. For this purpose, the temperature is varied in alternation between about −5° C. and 70° C. In spite of the fluctuating thermal expansion, the corrosion control layer does not undergo delamination, owing to its dynamomechanical properties.

Further panels with this corrosion layer are bent with a radius of 200 mm. The corrosion control layer is not delaminated.

In parallel, panels of this kind were provided with an underbody protection plastisol based on PVC and DINP, and cured at 165° C. for 15 minutes. The plastisol layer adheres flawlessly to the panel and to the corrosion control layer.

EXAMPLE 2

The construction of the adhesive tape is as follows:
siliconized polyester film
 40 μm solventborne acrylic pressure-sensitive adhesive
 250 μm melt coating of the following components:

| 100 phr | Softell A02 |
| 200 phr | Regalite R1100 |
| 30 phr | Ondina 933 |
| 1 phr | Irganox 1726, |

1 μm PVDC copolymer (Saran F 310)

Following removal of the liner, the adhesive tape is adhered in a width of 20 mm over the joint of two cathodically electrocoated steel panels 0.5 mm thick, with an overlap of 10 mm, and the silicone paper is removed.

This assembly is subsequently heated at 165° C. for 20 minutes. Heating leads to the melting of the polyolefin layer onto the metal surface, and so a uniformly flowed-out corrosion control layer is formed. After the metal panels have cooled, the corrosion control layer shows a smooth surface. The panel edge between the two metal panels still remains visible, but the joint is completely sealed.

The metal panels are subsequently subjected to different ambient conditions. For this purpose, the temperature is varied in alternation between about −5° C. and 70° C. In spite of the fluctuating thermal expansion, the corrosion control layer does not undergo delamination, owing to its dynamomechanical properties. Further panels with this corrosion layer are bent with a radius of 200 mm. The corrosion control layer is not delaminated.

In parallel, panels of this kind were coated with 2-component PU automotive paint, dried and cured at 140° C. for 10 minutes. The paint adheres flawlessly to the panel and to the corrosion control layer.

EXAMPLE 3

The construction of the adhesive tape is as follows:
siliconized polyester film with a thickness of 25 μm
 40 μm solventborne acrylic pressure-sensitive adhesive
 250 μm melt coating of the following components:

| 100 phr | PB 8640M |
| 100 phr | Foral 85 |
| 1 phr | Irganox 1726, |

25 μm, double-sidedly etched PET film

With the exception of the flexural test, the tests are carried out as in example 2, and the results are likewise flawless.

EXAMPLE 4

The construction of the adhesive tape is as follows:
siliconized polyester film with a thickness of 25 μm
   40 μm solventborne acrylic pressure-sensitive adhesive
250 μm melt coating of the following components:

| | |
|---|---|
| 100 phr | Vistamaxx 1100 |
| 100 phr | Regalite R1100 |
| 1 phr | Irganox 1726, |

25 μm, double-sidedly etched PET film

With the exception of the flexural test, the tests are carried out as in example 2, and the results are likewise flawless.

COMPARATIVE EXAMPLE 1

Execution takes place as described in example 1, but with LD 251 instead of NOTIO PN-0040. The formation of the corrosion control layer is flawless. In the alternating climatic conditions test, there are detachment phenomena at the ends of the corrosion control layer. In the flexural test, the corrosion control layer undergoes complete delamination. The plastisol layer adheres flawlessly to the metal panel, but not to the corrosion control layer.

COMPARATIVE EXAMPLE 2

Execution takes place as described in example 1, but with Engage 7467 instead of NOTIO PN-0040. The formation of the corrosion control layer is incomplete and of nonuniform thickness. At the top edge of the joint, the corrosion control layer has undergone partial runoff. In the flexural test, the corrosion control layer undergoes complete delamination. The plastisol layer adheres flawlessly to the metal panel, but not to the corrosion control layer.

The invention claimed is:

1. A method for corrosion control treatment of metal surfaces, the method comprises:
   applying an adhesive tape to a metal surface, wherein the adhesive tape has a layer comprising an olefin polymer having a density of between 0.86 g/cm$^3$ and 0.91 g/cm$^3$ and a crystallite melting point of at least 105° C., wherein the olefin polymer comprises ethylene or propylene and at least one further comonomer selected from $C_2$ to $C_{10}$ olefins, and a tackifier resin having a polydispersity of less than 2.1 and present at a concentration of at least 50 parts by weight per 100 parts by weight of the olefin polymer; and
   heating the adhesive tape such that the layer melts to form a corrosion control layer on the metal surface.

2. The method according to claim 1, wherein the olefin polymer has a melt index of less than 8 g/10 min and a flexural modulus of less than 50 MPa.

3. The method according to claim 1, wherein the olefin polymer is a block copolymer, a graft polymer or a heterophase polymer based on polypropylene.

4. The method according to claim 1, wherein the layer has a thickness that is between 50 μm and 750 μm.

5. The method according to claim 1, wherein a surface of the corrosion control layer has been modified to ensure sufficient adhesion to a subsequently applied plastisol layer or paint layer.

6. The method according to claim 1, wherein the layer melts at a temperature of not less than 90° C.

7. The method according to claim 1, wherein the layer is pressure-sensitive adhesive.

8. The method according to claim 1, wherein a pressure-sensitive adhesive is located between the layer and the metal surface.

9. The method according to claim 1, wherein the olefin polymer comprises ethylene or propylene and at least one further comonomer selected from $C_2$ to $C_{10}$ α-olefins.

10. The method according to claim 1, wherein olefin polymer is a copolymer of ethylene and propylene, ethylene and but-1-ene, ethylene and oct-1-ene or propylene and but-1-ene.

11. The method according to claim 1, wherein the olefin polymer is a terpolymer of ethylene, propylene, and but-1-ene.

12. The method according to claim 1, wherein the layer has a thickness that is between 100 μm and 600 μm.

13. The method according to claim 1, wherein the layer has a thickness that is between 200 μm and 400 μm.

14. The method according to claim 1, wherein the layer melts at a temperature of not less than 110° C.

15. The method according to claim 1, wherein the adhesive tape further comprises a pressure-sensitive adhesive based on one or more polyacrylates.

16. The method according to claim 1, wherein the tackifier resin comprises a hydrogenated hydrocarbon resin.

17. The method according to claim 1, wherein the metal surface comprises a joint of two panels.

18. The method according to claim 1, wherein the metal surface comprises one or more joints of one or more automobile bodies.

19. A method for corrosion control treatment of metal surfaces, the method comprises:
   applying an adhesive tape to a metal surface, wherein the adhesive tape has a layer comprising an olefin polymer having a density of between 0.86 g/cm$^3$ and 0.91 g/cm$^3$ and a crystallite melting point of at least 105° C., wherein the olefin polymer comprises ethylene or propylene and at least one further comonomer selected from $C_2$ to $C_{10}$ olefins, and a tackifier resin present at a concentration of at least 200 parts by weight per 100 parts by weight of the olefin polymer; and
   heating the adhesive tape such that the layer melts to form a corrosion control layer on the metal surface.

* * * * *